June 4, 1968  M. A. GUETTEL  3,387,112
RESISTANCE WELDER CONTROL CIRCUIT WITH UP-DOWN SLOPE
CONTROL AND CURRENT REGULATOR CIRCUITS
Filed Sept. 8, 1964  4 Sheets-Sheet 1

FIG. 1

INVENTOR.
MARVIN A. GUETTEL
BY
*William H. Schmeling*

INVENTOR.
MARVIN A. GUETTEL

INVENTOR.
MARVIN A. GUETTEL

United States Patent Office 3,387,112
Patented June 4, 1968

3,387,112
RESISTANCE WELDER CONTROL CIRCUIT WITH UP-DOWN SLOPE CONTROL AND CURRENT REGULATOR CIRCUITS
Marvin A. Guettel, Milwaukee, Wis., assignor to Square D Company, Park Ridge, Ill., a corporation of Michigan
Continuation-in-part of application Ser. No. 228,811, Oct. 6, 1962. This application Sept. 8, 1964, Ser. No. 394,970
10 Claims. (Cl. 219—114)

ABSTRACT OF THE DISCLOSURE

A solid state up-down slope control circuit and a current regulating circuit for a resistance welder controller including a capacitor and means for initiating a charge on the capacitor synchronously with reversals in polarity of an A.C. source so a unijunction type transistor which is switched in response to the magnitude of the charge on the capacitor will supply repetitive output signals to a logic circuit during each half cycle of the A.C. source at instants determined by the charging rate of the capacitor.

---

Figure 2:
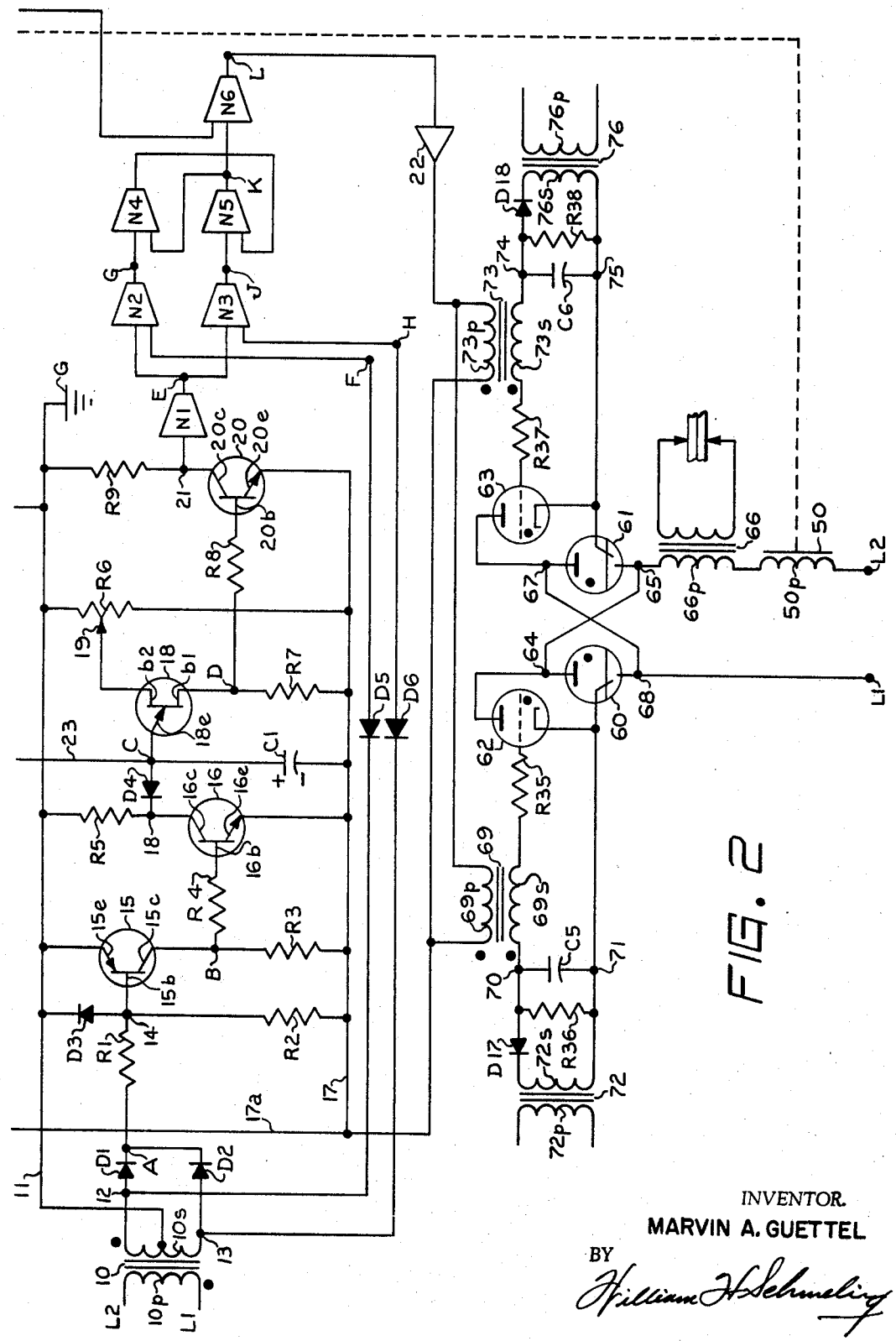

The present invention relates to control circuits and more particularly, to a circuit which will adjustably control the flow of energy from an alternating current source to a load, such as the electrodes of a resistance welding apparatus and is a continuation in part of my application Ser. No. 228,811, filed Oct. 6, 1962.

In resistance welding control, a welding transformer is usually energized by a pair of ignitrons which are connected in inverse parallel between a source of alternating current and a pair of movable welding electrodes. Current flow through the igniters of the ignitrons is controlled by a pair of thyratrons which have their anodes and cathodes connected in circuit with the anodes and igniters of the ignitrons. The thyratrons are grid controlled so their conduction is initiated at adjustable predetermined points on the voltage wave of the source. The foregoing arrangement causes the ignitrons to conduct for selected portions of each half cycle of alternating current of the source and thus provides a means for controlling the magnitude of energy of welding current to the welder electrodes. In present welding controllers this method of stepless variable firing of the ignitrons is called "heat control."

In a static welder control, the thyratrons in the weld firing means circuit may be rendered conductive by a pulse of positive voltage to their respective grids in a manner disclosed in U.S. patent application Ser. No. 129,- 828 which was filed on Aug. 9, 1961, by the inventors Charles F. Meyer and James J. Eckl. In the control disclosed in the Meyer application, a NOR circuit element is rapidly switched twice during each full cycle of the alternating current supply by a signal to its input. The output of the NOR is amplified and coupled through a transformer to the grids of the thyratrons so that each time the conductive state of the NOR circuit changes, a positive voltage is impressed on the grid of the thyratron which during the particular half cycle has a positive anode voltage.

While the heat control circuit as disclosed in the Meyer application is economical and provides satisfactory performance when manual heat control is desired, when "Up Slope," "Down Slope" and "Up and Down Slope" function is desired, the analog electrical signals required to cause the occurrence of these functions are difficult to incorporate in the circuit.

The circuit according to the present invention includes a novel heat control circuit and up slope circuit which is particularly suited for use with a static weld timer as shown in the Meyer application supra.

The circuit according to the present invention will not only provide the heat control function and the up slope function as is accomplished by the circuitry disclosed in application Ser. No. 228,811, but it will accomplish the additional functions of down slope, up and down slope, as well as regulating the flow of welding current during the entire weld interval.

It is an object of the present invention to provide a novel heat control circuit for use in a resistance welder.

It is a further object of the present invention to provide a novel circuit which will adjustably control the instants during each half cycle of alternating current at which the conduction of an electronic switch is initiated.

A further object of the present invention is to provide a novel circuit which will adjustably control the instant during each half cycle of alternating current at which the conduction of an electronic switch is initiated and to provide a means which will vary the adjusted instants at a predetermined rate.

A more specific object of the present invention is to provide the heat control circuit of a resistance welder with means for producing a signal pulse at a predetermined instant during each half cycle of an alternating current supply and a means for producing a pair of separate signals during the half cycles which are polarized with the alternating current supply and to provide a logic circuit which utilizes the signals as inputs to provide an output which will cause the conduction of a pair of inversely connected ignitrons to be initiated at a selected instant during the half cycles of an alternating current supply.

A still further object of the present invention is to provide a resistance welder control with a polarity responsive contactor section which is arranged to pass alternate polarity half cycles of alternating current from a source to a load and to adjustably control both the number of half cycles and the portion of each half cycle of current flow when the source passes current to the load with circuit means which includes a heat control circuit which has a chargeable capacitor and a means initiating the charging of the capacitor synchronously with the changes in polarity of the source and a means which is responsive to the charge on the capacitor for supplying an output signal whenever the charge on the capacitor reaches an adjustable value, and to control the charging of the capacitor with a current regulating circuit which is arranged to supply a charging current to the capacitor in response to the algebraic difference between the current to the load and a reference source and to supply the output signal from the heat control circuit to a logic circuit which also receives signal inputs from the means which synchronizes the charging of the capacitor so that the logic circuit may supply input signals of predetermined polarity to the contactor section for controlling the duration and intensity of current flow from the source to the load.

Another object of the present invention is to provide a resistance welder with a heat control circuit and an up and down slope circuit which includes means for producing a pulse during each half cycle of an alternating current supply which pulses are synchronized with the polarity of the supply and occur at adjustable instants during the half cycle and a means for varying the instants of occurrence of the pulses during the half cycles at a predetermined rate during the initial and final period of welding current flow.

It is an additional object of the present invention to provide a resistance welder control with a polarity responsive contactor section which is arranged to pass alternate polarity half cycles of alternating current from a source to a load and to adjustably control both the number of half cycles and the portion of each half cycle of current flow when the source passes current to the load with circuit means which includes a heat control circuit which has a chargeable capacitor and a means initiating the charging of the capacitor synchronously with the changes in polarity of the source and a means which is responsive to the charge on the capacitor for supplying an output signal whenever the charge on the capacitor reaches an adjustable value, and to control the rate of charging of the capacitor with an up slope down slope circuit at the beginning and end of each weld interval as determined by a weld timer and to supply the output signal from the heat control circuit to a logic circuit which also receives signal inputs from the means which synchronizes the charging of the capacitor so that the logic circuit may supply input signals of predetermined polarity to the contactor section for controlling the duration and intensity of current flow from the source to the load.

Further objects and features of the invention will be readily apparent to those skilled in the art from the specification and appended drawing illustrating certain preferred embodiments in which:

FIGS. 1 and 2, when combined schematically, show the arrangements and components as used in circuit according to the present invention.

Figure 3:
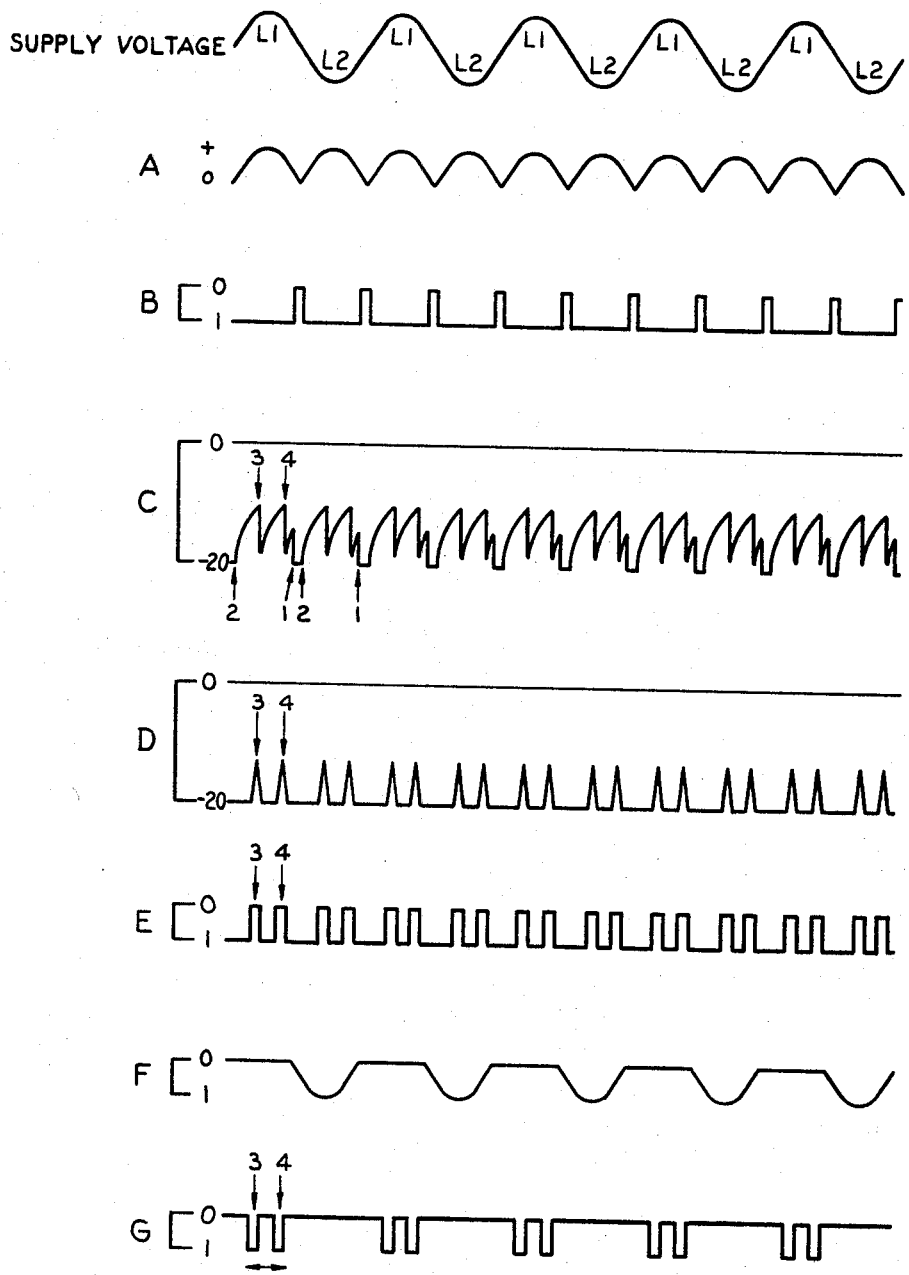
Figure 4:
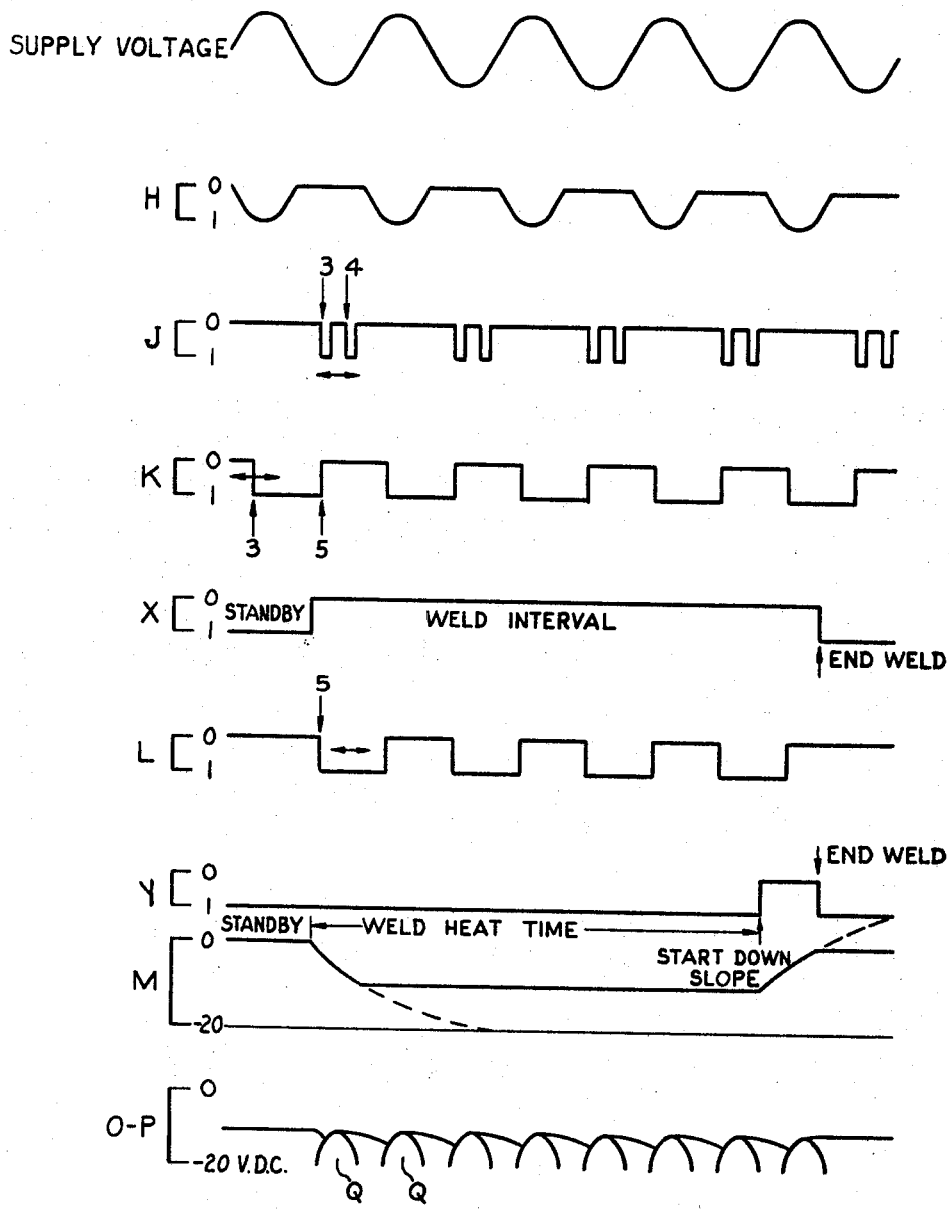

FIGS. 3 and 4 illustrate the curves and signals with time as a reference as provided by the components in the circuit shown in FIGS. 1 and 2.

In FIG. 2 of the drawings, a heat control circuit is shown which includes a transformer 10 having a primary winding 10P and a secondary winding 10S. The primary winding 10P is energized by a source of alternating current connected to lines L1 and L2 and the secondary winding 10S has a center tap connected through a lead 11 to a ground G. The secondary winding 10S has a pair of output terminals 12 and 13 which are respectively connected through a pair of diodes D1 and D2 to a common junction A. The junction A is connected through a resistor R1 to a junction 14. The junction 14 is connected through a diode D3 to the lead 11 and through a resistor R2 to a lead 17 which in turn is connected through a lead 17A to a negative voltage source indicated as −20 volts D.C. in FIG. 1. The junction 14 is also connected to a base 15b of a PNP type transistor 15 which has an emitter electrode 15e and a collector electrode 15c. The emitter 15e is directly connected to the lead 11 and the collector 15c is connected through a junction B and a resistor R3 to the lead 17. The junction B is connected through a resistor R4 to a base 16b of a NPN type transistor 16. The transistor 16 has an emitter electrode 16e directly connected to the lead 17 and a collector electrode 16c connected through a junction 18 and a resistor R5 to the lead 11. The junction 18 is connected through a diode D4 to a junction C. The junction C is connected through a capacitor C1 to the lead 17 and through a lead 23 to circuitry shown in FIG. 1, as will be hereinafter explained. The junction C is also connected to an emitter electrode 18e of a unijunction type transistor 18 which has a pair of base electrodes designated as b1 and b2. The electrode b2 is connected to a slider 19 of a potentiometer resistor R6 which is connected between the leads 11 and 17. The electrode b1 is connected through a junction D and a resistor R7 to the lead 17. The junction D also is connected through a resistor R8 to a base electrode 20b of a NPN type transistor 20 which has an emitter electrode 20e and a collector electrode 20c. The emitter electrode 20e is directly connected to the lead 17. The collector electrode 20c is connected through a junction 21 and a resistor R9 to the lead 11. The junction 21 is also connected to an input of a NOR unit N1 which has an output connected to a junction E. The junction E is connected to the inputs of a pair of NOR units N2 and N3 which are connected to provide an "AND" logic function and also respectively receive inputs through terminals F and H and diodes D5 and D6 from the output terminals 12 and 13 of the transformer secondary 10S. The output terminals of the NORS N2 and N3 are connected through terminals G and J to the input terminals of a pair of NORS N4 and N5. The NORS N4 and N5 are interconnected as a NOR memory, the output of which is taken as the output of the NOR N5 at a terminal K. The terminal K is connected as an input to a NOR N6 which provides an output signal at a terminal L. The terminal L supplies an input to an amplifier designated as 22 which provides an output to circuitry which will be hereinafter described.

In FIG. 1 of the drawings, an up slope and down slope control circuit is shown which receives input signals at a pair of terminals X and Y of a weld timer. The weld timer is energized by a suitable source, not shown and is preferably of the type disclosed in the Meyer application supra, to provide output signals at the terminals X and Y which will be later explained. The output terminal X of the weld timer is connected through a resistor R10 to a base electrode 30b of a PNP type transistor 30. The transistor 30 has an emitter electrode 30e directly connected to a lead 11 which is connected to a ground G. In this connection it is to be noted that the lead 11 in FIG. 1 is electrically the same as the lead 11 in FIG. 2. The transistor 30 also has a collector electrode 30c connected through a junction 31 and a resistor R11 to a lead 17 which electrically corresponds to the lead 17 in FIG. 2 and which is connected to a negative voltage source such as a negative 20 volts D.C. The junction 31 is connected through a diode D8 to a terminal M. The terminal M is connected through a junction 32 and a diode D9 to the lead 11 and through a capacitor C2 to the lead 17. The term M is also connected through a diode D12 to a junction 36 which is located between a pair of resistors R14a and R14b which have their opposite ends connected as a voltage dividing network between leads 11 and 17. The junction M additionally is connected through a pair of parallel circuits to a junction 33. One of the parallel circuits consists of resistor R12 and diode D10 and the other parallel circuit includes the resistor R13 and diode D11. The junction 33 is connected in circuit with a collector electrode 35c of a NPN type transistor 35 which has an emitter electrode 35e and a base electrode 35b. The collector electrode 35c is connected through the junction 33 to a junction 34 which is located between a pair of voltage dividing resistors R15a and R15b that are connected between the lead 11 and a positive source of direct voltage indicated as +20 volts D.C. The junction 32 is connected through a resistor R16 to a base electrode 37b of a PNP type transistor 37 which has an emitter electrode 37e directly connected to the lead 11 and a collector electrode 37c directly connected to a lead 38. The base electrode 35b of the transistor 35 is connected through a resistor R17 to a junction 39. The junction 39 is connected in circuit with a collector 40c and an emitter 40e of a PNP transistor 40. The emitter 40e is directly connected to the lead 11 and collector 40c is connected through the junction 39 and a resistor R18 to the lead 17. The transistor 40 has a base electrode 40b connected through a resistor R19 to the terminal Y which is also connected through a resistor R21 to a base 42b of a PNP type transistor 42. The junction 39 is also connected through a diode D12 and a junction 41 and a resistor R20 to the lead 17. The transistor 42 has an emitter electrode 42e directly connected to the lead 11 and a collector electrode 42c connected through a diode D13 and a potentiometer resistor R22 to the lead 38. The junction 41 is connected through a resistor R23 to a base electrode 43b of a PNP type transistor 42 which has an emitter electrode 43e directly connected to the lead 11 and a collector electrode 43c connected through a diode D14 and a potentiometer resistor R24 to the lead 38. The lead 38 is connected through a junction 44 and a normally open switch SW2 to ground to the lead 11 in FIG. 2 and through a pair of series connected potentiometer resistors R25 and R26 to a contact K1 of a switch SW1 which has an additional contact K2. The switch SW1 has a movable contact connected to lead 23 in FIG. 1 so as to provide a connection with either of the contacts K1 or K2.

A current regulator section as shown in FIG. 1 includes a transformer 50 which has a secondary winding 50S and a primary winding 50P. The primary winding 50P is connected in a circuit between a source and a load, as will be hereinafter described. The association between the primary winding 50P, shown in FIG. 2, and the secondary winding 50S, in FIG. 1, is indicated by a broken line connection. The output of the secondary winding 50S is rectified by a full wave rectifier 51 and impressed across a pair of terminals designated as terminals O and P. A parallel circuit consisting of a capacitor C3 and a resistor R28 is connected between the terminals O and P. The terminal P is connected to a slider 52 of a potentiometer resistor R29 which has its respective ends connected between the ground G and the lead 17. The terminal O is connected to a junction N which is connected through a series circuit including a diode D15, a potentiometer resistor R30 and an output of a NOR N7 which receives its input from the junction X of the weld timer. The terminal N additionally is connected through a potentiometer resistor R31 to a base electrode 53b of a PNP type transistor 53. The potentiometer resistor R31 has a slider connected through a capacitor C4 to the lead 11. The transistor 53 has a collector electrode 53c directly connected to the lead 17 and an emitter electrode 53e connected through a junction 54, a diode D16, a junction 55 and a resistor R32 to the lead 11. The junction 55 is directly connected through a potentiometer resistor R33 to the lead 17. The junction 54 is connected through a resistor R34 to a base electrode 56b of a PNP type transistor 56. The transistor 56 has an emitter electrode 56e directly connected to the lead 11 and a collector electrode 56c directly connected through a suitable load to the contact K2 of the switch SW1.

A typical ignitron type firing panel is shown in the lower portion of FIG. 2. The panel includes a pair of ignitron tubes 60 and 61, each provided with an anode, cathode and igniter electrode and a pair of electronic switches, such as thyratrons 62 and 63, each of which respectively has an anode, cathode, and a control grid. The anode of thyratron 62 is connected through a junction 64 and a junction 65 and a primary winding 66P of a welding transformer 66 and the primary winding 50P to a supply lead L2. The cathode of ignitron 61 is connected to the junction 65. The anode of thyratron 63 is connected through a junction 67 to a junction 68 which is connected to the cathode of ignitron 60 and to a supply lead L1. The leads L1 and L2 are connected to a suitable source of alternating current. The thyratron tubes 62 and 63 each are provided with a grid bias circuit which normally maintains the thyratrons non-conductive which will now be described. The control grid of the thyratron 62 is connected through a suitable current limiting resistor R35 and a secondary winding 69S of a transformer 69 to a junction 70. The cathode of thyratron 62 is connected through a junction 71 and a capacitor C5 to the junction 70. The capacitor C5 is charged with a bias to maintain the thyratron 62 non-conducting by a circuit which includes a rectifying diode D17 and a secondary winding 72S of a transformer 72 which has a primary winding 72P connected to the alternating current supply which supplies leads L1 and L2. Connected across the diode D17 and the secondary 72S is a resistor R36 which is in parallel with the capacitor C5 across the supply. The diode D17 is arranged in the circuit so normally the cathode of the thyratron tube 62 is positive relative to the grid. Similarly, the control grid of the thyratron 63 is connected through a suitable current limiting resistor R37 and a secondary winding 73S of a transformer 73 to a junction 74. The cathode of thyratron 63 is connected through a junction 75 and a capacitor C6 to the junction 74. The capacitor C6 is charged with a bias to maintain the thyratron 63 non-conducting by a circuit which includes a rectifying diode D18 and a secondary winding 76S of a transformer 76 which has a primary winding 76P connected to the alternating current supply which supplies the leads L1 and L2. Connected across the diode D18 and the secondary 76S is a resistor R38 which is in parallel with the capacitor C6 across the supply. The diode D18 is arranged in the circuit so normally the cathode of the thyratron tube 63 is positive relative to the grid.

The control circuit as shown in FIG. 2 also includes the conventional amplifier 22 which is responsive to the output signal from the NOR N6 at the terminal L. The amplifier 22 is energized from a suitable source of D.C. current, not shown. When the amplifier 22 receives a signal change from the NOR N6, as will be hereinafter explained, a current change is transmitted to the pair of primary windings 69P and 73P of the transformers 69 and 73. The effect of this current change in transformer primary windings will be hereinafter explained.

The circuit shown in FIGS. 1 and 2 includes a plurality of NOR circuit elements which are well known and fully described in the Meyer application supra. If a NOR element receives a signal to any of its inputs, i.e., a negative signal which will hereinafter be designated as a "1," then a signal will be absent at an output of the NOR element. The absence of a signal will be hereinafter referred to as a "0" signal. If none of the inputs of a NOR element receive an input signal, i.e., all of the inputs have a "0" input, then the output signal of the NOR element will be "1."

In the description of operation of the circuit which follows, the resistors R1, 2, 4, 8, 10, 16, 17, 19, 21, 23 and 34 act in the base circuits of the transistors with which they are included as conventional current limiting resistors. Similarly, the resistors R3, 5, 9, 11, 18 and 20 act as collector load resistors in the circuits wherein they are included. The resistors R28, 36 and 38 respectively provide discharge paths for capacitors C3, C5, and C6 and the resistors R35 and R37 act as grid resistors for the thyratron tubes 62 and 63. The resistor R32 acts as an emitter load resistor for transistor 53 and the resistors R14a and R14b and R15a and R15b act as a voltage divider network in a conventional manner. The diodes shown in the circuitry each are arranged to block current flow in one direction and freely pass current in the opposite direction and are included mainly for isolation purposes. The diodes are poled to conduct in each of the circuits in the direction in which they point. For example, diode D1 will conduct current from junction 12 to junction A. In the interest of simplifying the explanation of the present invention, certain well known circuit components have been omitted from the circuitry. These components include conventional devices, such as temperature stabilizing resistors, resistors which are usually included in the emitter circuits of the transistors for gain stabilization, transient filters using resistors, avalanche diodes and capacitors in the signal and power supply circuits and amplifying circuits including transistors for the input and output circuits. The inclusion of these well known circuit components is readily apparent to those skilled in the art to which the present invention relates.

With the foregoing in mind, the operation of the circuit will be described in connection with the curves shown in FIGS. 3 and 4. In FIGS. 1 and 2, a suitable alternating current source, not shown, is arranged to energize the primary windings of transformers 10P, 72P, 76P, lines L1 and L2 and the weld timer with alternating currents which are in phase with one another. The voltage wave of the source is illustrated by the curve designated as "Supply Voltage" in FIGS. 3 and 4. The dots at the respective ends of the primary and secondary windings of transformers 10, 69, and 73 designate the end of the windings which have a positive polarity when line L1 is positive.

Also in FIGS. 3 and 4 the curves A, B, C, D, E, F, G, H, J, K, L and M indicate the potential between the corresponding designated junctions in FIGS. 1 and 2 and ground G and the curve O-P in FIG. 4 designates the potential between junctions O-P in FIG. 1. Each of the curves A–H and K–P are shown with time as a reference as dictated by the reversals in the supply current curve shown in the upper portion of FIG. 3.

When an alternating current supply is connected to the lines L1 and L2, the secondary winding 10S of the transformer 10 will supply current having an alternating polarity as shown by the curve labeled "supply voltage" in FIG. 3. The output of the secondary winding 10S is rectified by the diodes D1 and D2 and is impressed at the junction A as a series of voltage pulses as shown in curve A in FIG. 1. During the intervals when the voltage of each pulse is positive at terminal A, the transistor 15 will be biased against conduction. The diode D3, which provides a return path for the current at the junction A, also limits the voltage between the base 15b and the emitter 15e to the forward voltage drop across the diode D3. When the current at the terminal A approaches zero during the interval between each of the pulses, as when the supply current changes from an L1 polarity to an L2 polarity and vice versa, the transistor 15 will not be biased against conduction and will switch to a conductive state thus supplying an output signal change at the junction B, which is shown on the curve B in FIG. 3. It will be seen that prior to the conduction of the transistor 15, the junction B is −20 volts D.C. potential, which is indicated as a "1" in the curve B. However, when the transistor 15 conducts, the junction B potential changes and becomes more positive, approaching the potential of ground G, which is indicated as a "0" in the curve B. Thus the junction B will provide a series of "0" pulses of short duration whenever the transistor 15 conducts. During the intervals when the junction B has a "1" signal thereon, the transistor 16 is maintained non-conductive. However, when the transistor 15 conducts, the junction B polarity becomes more positive and the transistor 16 conducts to provide a low impedance discharge path for the capacitor C1 through the diode D4, so that the charge on capacitor C1 rapidly becomes "0" at the instants in time at the end of each half cycle of the supply current indicated by the arrow 1 on the curve C in FIG. 3. The conduction of the transistor 16 exists for only a brief interval. When the transistor 16 again becomes non-conductive at the instants designated by the arrow 2 on curve C, the capacitor C1 begins to charge through circuits which will be hereinafter explained which are connected to the lead 23. As the charge on capacitor C1 increases, it will eventually exceed the intrinsic standoff ratio of the unijunction transistor 18 and cause the unijunction transistor 18 to be rendered conductive and discharge the capacitor C1 at the instant in time during each half cycle of the supply current indicated by an arrow 3 in the curve C. The discharge path for the capacitor C1 includes the junction C, the emitter 18e, the base b1, and the junction D. Prior to the conduction of the unijunction transistor 18, the junction D is maintained at a potential of the negative 20 volt supply at lead 17 as shown on curve D of FIG. 3. This negative voltage at the junction D biases the transistor 20 against conduction. When the unijunction transistor 18 switches to its conductive state, at the instant indicated by arrow 3 on curve C, the potential at the junction D suddenly becomes more positive to provide a series of voltage pulses as indicated by the arrows 3 on the curve D. When the junction D becomes more positive, the transistor 20 is biased to its conductive state to provide a low impedance path for the charge on the capacitor C1 through a circuit which includes the junction D, the resistor R8 and the base 20b to the emitter 20e of the transistor 20.

Prior to the conduction of the transistor 20, the junction 21 will be maintained at a ground potential which represents a "0" in a NOR logic system. When the transistor 20 conducts, the potential at the junction 21 approaches the negative 20 volt D.C. supply which is designated as a "1" in a NOR logic system and the NOR N1 is switched from a state wherein its provide a "1" output signal to a "0" output signal at the junction E at the instants indicated by arrow 3 on the curve E. This change in the signal from "1" to "0" at the junction E is utilized as an input to a logic circuit which includes the NORS N2–N6, as will be hereinafter described.

It is apparent that the circuitry connected to lead 23 can be arranged to charge the capacitor C1 several times during each half cycle of the supply. Thus each time the capacitor C1 charges to a potential which will cause the unijunction transistor 18 to be switched to its conductive state; for example, at the instant, indicated by arrow 4 in curve C, the potential at the junction D will change and provide a positive pulse which causes the signal at the junction E to become "0" at the instant indicated by arrow 4 in curve E. These positive pulses which occur subsequent to the initial pulse at the instant designated by arrow 3 merely are present and are without any effect in the sytem as will be later described. It is clear that when the transistor 15 is rendered conductive to cause the change of potential at junction B in a manner indicated in curve B, the transistor 16 will provide a short circuit path for the charge on capacitor C1 beginning at the instant indicated in arrow 1 in curve C. This short circuit path will exist during the brief time interval indicated by the arrows 1 and 2 in curve C. Thus the capacitor C1 will begin to charge precisely at the same instant during each half cycle of the supply current at the instants indicated by arrow 2 in curve C when the junction B potential charges from a "0" to a "1." The rate of charge of the capacitor C1 and therefore the instant during each half cycle which is designated by arrow 3 in curve C will be determined by the charging current imposed on the lead 23 which also determines the number of charging and discharging cycles of the capacitor C1 during each half cycle of both the L1 and L2 polarity. Thus because the initial instant of charging of the capacitor C1 during each half cycle is constantly synchronized with the polarity changes of the supply current, the instants of occurrence of arrows 3 during each half cycle will be synchronized with the supply current and may be varied by changing the charging current for capacitor C1.

As shown in FIG. 2, the terminals F and H are connected through diodes D5 and D6 to terminals 12 and 13 of the transformer secondary winding 10S. During the interval when terminal 12 has a positive polarity impressed thereon, diode D5 will block current flow and maintain the terminal F at a "0" potential as shown on the curve F. Concurrently, the diode D6 will permit current to flow from the terminal H to the terminal 13 to cause the terminal H to have a "1" signal impressed thereon, as shown in curve H. Thus during each L1 half cycle the terminal F signal will be "0" and during each L2 half cycle the signal at terminal H is "0." The junction E is connected as inputs to both NORS N2 and N3. The NORS N2 and N3 are connected as an "AND" circuit and also respectively receive inputs from the terminals F and H. Thus during the time interval when the line L1 has a positive polarity, the input signal at terminal F will be "0." However, as shown on curve D, the terminal E has a "1" signal normally impressed thereon which changes briefly to a "0" beginning at the instant indicated by arrow 3. During the short interval when the signals at both of the terminals E and F are "0," the output of the NOR N2 switches to provide a "1" signal pulse at the junction G, as shown on the curve G. It will be noted from the curve G that the switching of the NOR N2 occurs once during each L1 half cycle and instant of the initial switching will be dictated at the instant indicated by the arrow 3 in curve C during the respective L1 half cycles. Further it will be noted that after the initial switching of the NOR N2 has occurred during each L1 half cycle, the NOR N2 may be subsequently switched during the same half cycle, but this detail is unimportant to the operation of the circuit. Also it will be noted from the curve H, during each L2 half cycle the signal at the terminal H changes to "0," and from the curve E, during each L2 half cycle the signal at the terminal E momentarily becomes "0." Thus during each L2 half cycle, during the momentary intervals when the signals at the terminals E and H are "0," the NOR N3 will switch to provide a "1" output signal pulse at the junction J as shown on the curve J. The instant of switching from "0" to "1" at the terminal J occurs at the instant indicated by the arrow 3 during each L2 half cycle. Also as shown on the curve J, the signal at the terminal J may additionally switch to provide momentary "1" signals at later instants of each L2 half cycle. This later switching of the NOR N3 to provide subsequent "1" signals is unimportant insofar as the circuitry of the present invention is concerned. Further as the rate of charging of capacitor C1 may be varied, the instants designated by arrow 3 will vary and cause the instants of occurrence of the pulses on curves G and J to vary. This effect is illustrated by the horizontal arrows in the curves in FIGS. 3 and 4.

It will be seen that the terminal G is connected as an input to the NOR N4 and the terminal J is connetced to the NOR N5. The NORS N4 and N5 are connected as a NOR memory. Thus when the signal at the terminal G becomes a momentary "1," the output of the NOR N5 switches to provide a "1" signal at the junction K at the instant indicated by the arrow 3 on the curve K. Further it will be seen that when the signal at the terminal J changes to a "1," the output of the NOR N5 will switch from a "1" to "0" at the instant indicated by the arrow 5 in curve K. Thus the signal at the terminal K switches from "0" to "1" and from "1" to "0" during the respective half cycles of the L1 and L2 polarity and the instant of switching of the NORS N4 and N5 will be determined by the instant of occurrences of the signal changes at the terminals G and J, which instants are variable in time as indicated by the horizontal arrows.

During standby conditions the weld timer, shown in FIG. 1, supplies a "1" signal at the terminal X in a manner fully disclosed in the Meyer application, supra. When the weld is to be initiated preferably at 85° after voltage "0" during an L2 half cycle of the alternating current supply, the weld timer supplies a "0" signal to the terminal X. The signal at the terminal X is supplied as an input to the NOR N6. Thus during standby conditions, the output signal at the terminal L which is supplied by NOR N6 appears as a constant "0" as shown by the curve L. It will be noted that NOR N6 also receives an input signal from the junction K. Thus if the circuitry is adjusted to provide signals at the instants shown by the curves in FIGS. 3 and 4, when the weld time is initiated, the signal at terminal L does not immediately change because the signal at terminal K continues as a "1" signal. If the circuitry were adjusted so that the arrow 5 were positioned to occur earlier in the L2 half cycle, then the signal change at terminal X would govern the change in conduction of NOR N6. Thus when the signal at terminal X changes, the conduction of NOR N6 does not change until the signal at terminal K changes from "1" to "0." When the signal at terminals X and K are both "0," the output of NOR N6 switches so a "1" signal appears at terminal L which "1" signal again becomes "0" when the signal at terminal K again becomes "1." Thus the signal at terminal L will switch from a "0" to a "1" at an instant during each L2 cycle and will change from a "1" to a "0" at the same corresponding instant during the L1 cycle. This change in the signal at terminal L which is shown on curve L is utilized to control the operation of the circuitry which passes current from the supply through the welding electrodes in a manner which will be hereinafter explained. At the end of the weld interval, preferably at 355° during an L1 half cycle, in a manner fully disclosed in the Meyer application supra, the weld timer changes the signal at terminal X to a "1" as shown on curve X. When the "1" signal input at junction X is applied to NOR N6 the signal at terminal L becomes a constant "0" so that the flow of weld current which was initiated during an L2 half cycle is terminated at the end of an L1 half cycle. This arrangement provides for the firing of the ignitrons 60 and 61 of the welder control so equal portions of an equal number of L1 and L2 half cycles of welding current are passed through the primary winding 66P of the welding transformer 66 to avoid saturation of the welding transformer 66. This feature is termed "lead trail firing" and is well known to those skilled in the art.

The operation of the up-down slope circuitry shown in FIG. 1 which controls the charging rate of the capacitor C1 in FIG. 2 is as follows: During standby conditions the junctions X and Y both receive a "1" signal from the weld timer as shown on the curves X and Y. The "1" signal at juncton X which is applied to the base electrode 30b causes the transistor 30 to conduct to thereby charge the capacitor C2 through a circuit which includes the emitter 30e, the collector 30c, the junction 31, the diode D8, the junction M and the capacitor C2. The charge on the capacitor C2 is illustrated by the potential at junction M, as shown by curve M.

The "1" signal at the junction Y also causes the transistors 40 and 42 to conduct. The conduction of the transistor 40 causes the transistor 35 to be conductive as it is of the NPN type and the transistor 43 to be non-conductive, as it is of the PNP type. The charge on the capacitor C2 causes the transistor 37 to be non-conductive. As the transistors 37 and 43 are both non-conductive and the transistor 42 is biased to conduction, current flows from the lead 11 to lead 38 through a circuit which includes the emitter 42e, the collector 42c, the diode 13 and the potentiometer resistor 22. The intensity of this current flow will be dictated by the setting of the slider on resistor 22. Thus if the switch SW1 is closed to complete the circuit to contact K1 and the switch SW2 is open, the current flow to lead 23 and the charging rate of the capacitor C1 of the heat control section of the control, as shown on FIG. 2, will initially be determined by the position of the slider on the resistor 22.

At the end of the standby period and at the beginning of the weld period, the signal at the junction X changes to "0," as shown on the curve X. The "0" signal at the junction X causes the transistor 30 to switch to a nonconductive state, thereby interrupting the charging circuit for the capacitor C2. The charge on the capacitor C2 is dissipated through a RC circuit which includes the resistor R13, the diode D11 and the conducting transistor 35. The rate of discharge of the charge is controlled by the position of the slider on the resistor R13. The discharge of the capacitor C2 is shown on curve M and as the capacitor C2 progressively discharges, the rate of conduction of transistor 37 progressively increases, so as to provide a progressively increasing short circuit around the circuit which includes the transistor 42 and the resistor R22. As the rate of conduction of transistor 37 is increased, the current flow between leads 11 and 38 which are connected through the switch SW1 to lead 23 in the charging circuit of capacitor C1 progressively increases and the rate of charge of the capacitor C1 is progressively increased during the respective L1 and L2 half cycles. The discharge of the charge on the capacitor C2 ceases when the charge across the capacitor C2 equals the potential provided by the voltage divider which includes the resistors R14a and R14b which supplies a potential through the diode D12 to the junction M. This feature is included because, as shown by the dotted line portion on the curve M, as the capacitor reaches its fully discharged condition, the rate of change of the charge progressively decreases. The inclusion of the bias voltage provided through the diode D12 effectively renders the down slope operation which is governed by the rate of discharge of the capacitor C2 more linear.

At some instant during the weld time, as dictated by the output of the weld timer, the signal at the junction Y changes from a "1" to a "0" to begin the down-slope time interval. The change in the signal at the junction Y causes the transistors 40 and 42 to be non-conductive. The change to the non-conduction condition of the transistor 40 causes the transistor 35 to be non-conductive and the transistor 43 to switch to its conductive state. The transistor 37 remains in its conductive state as the capacitor C2 is discharged. Therefore as the transistors 37 and 43 are both conductive, a maximum current flow is supplied from lead 11 to lead 38 and through switch SW1 to lead 23 in the charging circuit of capacitor C1.

The switch to the non-conductive state of the transistor 35 interrupts the discharge circuit for capacitor C2 and the capacitor C2 begins to charge through a RC circuit which includes the positive voltage supply as furnished to the junction 34, the diode D10 and the resistor R12. The rate of charging of the capacitor C2 is governed by the setting of the slider on the resistor R12. The charging of the capacitor is shown on curve M which begins at the start of the down-slope time. As the capacitor C2 progressively is charged, the conduction of the transistor 37 is progressively decreased. The charging of the capacitor C2 is terminated when the potential at the junction 32 equals the forward voltage drop across the diode D9 which acts as a voltage clamp for the circuit. It is to be observed from curve M that as the charge on the capacitor C2 approaches its fully charged condition the rate of charge progressively decreases. This is illustrated by the dotted line portion on the curve M. Therefore the use of the diode D9 to provide a voltage clamp for the circuit increases the linearity of the rate of charge of the capacitor C2 during the down-slope interval. As the conduction of the transistor 37 is progressively decreased, due to the increasing charge on the capacitor C2, the effect of the short circuit provided by the transistor 37 around the transistor 43 and the resistor R24 is progressively decreased and correspondingly the charging rate of the capacitor C1 will be progressively decreased. Ultimately, when the transistor 37 reaches its minimum conductive state, the charging current for capacitor C1 will be governed by the adjustment of resistor 24.

At the end of the weld interval the signals at junctions X and Y both become "1" so that the system is returned to the standby conditions wherein the capacitor C2 is fully charged as previously described.

The operation of the current regulator circuitry in FIG. 1 is as follows. During standby conditions, the NOR N7 receives a "1" input signal from the weld timer at the junction X. The "1" input signal to the NOR N7 causes the NOR N7 to supply a charging current to the capacitor C3 through a circuit which includes the NOR N7, the resistor R30, the diode D15, the junction O, the capacitor C3, the junction P, the slider 52 and the resistor R29 and lead 17. The capacitor C3 is thus charged during standby conditions with a potential determined by the settings of the sliders on the potentiometer resistors R30 and R29 in a direction making the junction O side positive and the P side negative, as shown on curve O–P. The charge on the capacitor C3, which causes the potential at the junction O to be positive with respect to ground G, causes the transistor 53 to conduct current with a magnitude dependent upon the potential difference between the junction O on the ground G. The emitter electrode 53e is connected in the circuit with the emitter electrode 56e and the base electrode 56b of the transistor 56. Thus as transistor 53 conducts, the transistor 56 is biased to conduction to pass current from lead 11 through the emitter electrode 56e and the collector electrode 56c to the switch contact K2. If the switch SW1 is positioned to complete the circuit to contact K2, the capacitor C1 in FIG. 2 will be furnished with a charging current which flows through the transistor 56 as dictated by the potential at the junction O.

At the end of the standby period, the weld timer causes the signal at the junction X to become "0" and the NOR N7 ceases to supply a charging current to the capacitor C3. The charge on the capacitor begins to decay through its discharge resistor R28 at a rate shown on curve OP. Therefore prior to the beginning of welding current flow through the load circuit which includes the ignitrons 60 and 61 and the welding transformer 66, the conductive state of the transistor 56 is controlled by the initial charge which was impressed on the capacitor C3 and therefore the charging rate of the capacitor C1 is initially controlled by the charge which was impressed upon the capacitor C3. When the ignitrons 60 and 61 conduct, in a manner which will be hereinafter explained, to the load which includes the welding transformer 66 and the transformer 50, the primary winding 50P causes the transformer secondary winding 50S to supply an alternating voltage to the rectifier 51. This voltage consists of a series of current pulses which are shown in rectified form as pulses Q on curve OP. The magnitude of the direct current pulses will depend upon the interval of conduction of the ignitrons during each half cycle of the alternating current supply. The rectifier 51 rectifies the alternating output of the transformer secondary winding 50S and provides a series of charging current pulses to the capacitor C3 which cause the junction O side thereof to have a positive polarity. The junction P side of the capacitor is connected through the slider 52 to the potentiometer resistor R29. The resistor R29 is connected between the negative 20 volt D.C. source and the ground G, so depending upon the position of the slider 52 on the resistor R29 an adjustable reference voltage will be impressed on the capacitor C3 in opposition to the charge on the capacitor C3 which is provided by the rectifier 51. Thus the potential on the capacitor C3 will be the algebraic difference between the voltages generated by the current pulses supplied by the transformer 50 and the voltage supplied by the slider 52. Thus after the initial half cycle of current flow through the load, the charge on the capacitor C3 as provided by the rectifier 51 will control the conduction of transistor 53 and transistor 56. It will be seen that as the charging current supplied by the transformer 50 increases, the charge on the capacitor C3 will be in a direction to reduce the conduction of transistors 53 and 56 and as the charging potential supplied to capacitor C3 by the transformer 50 is reduced, the conduction of transistors 53 and 56 is increased. Thus an increase in current flow through transformer 50 will cause a decrease in the charging current supplied to capacitor C1 so that heat control circuit will cause the ignitrons 60 and 61 to conduct later during each of the respective half cycles to decrease the current flow through the load which includes the transformer 66.

Further it is apparent from the circuit shown in FIG. 1 that the base electrode 56b of the transistor 56 is connected through the junction 54, the diode D16, the junction 55, and the resistor R33 to the lead 17. Thus depending upon the adjustment of the slider on the resistor R33, the potential at the junction 54 may be varied.

The diode D16 and the resistor R33 are arranged to limit the potential at the junction 54. This arrangement will cause the transistor 56 to conduct a minimum current independently of the conduction state of transistor 53 when the transistor 53 is biased against conduction by the charge on the capacitor C3.

As shown on curve X, at the beginning of the weld interval the output signal from the weld timer at terminal X changes from a "1" to a "0." This signal change is supplied to the NOR N6 so that the switching of NOR N6 is controlled solely by the output signal at junction K of the NOR memory which is shown on curve K. Thus at a predetermined point during each of the half cycles of L1 and L2 polarity, NOR N6 switches and provides an output signal which would appear as a complement of the curve K. The output signal of NOR N6 is amplified by the amplifier 22. The output of the amplifier 22 is connected through the primary windings 69P and 73P of transformers 69 and 73. The transformers 69 and 73 are constructed and arranged so the induced voltage in the secondary windings 69S and 73S in response to the current changes in the output of amplifier 22 overcomes the bias provided by capacitor C5 on the grid of thyratron 62 and the capacitor 66 on the grid of thyratron 63 during the half cycles when the anodes of thyratrons 62 and 63 have a positive polarity. Thus during the L1 polarity half cycle thyratron 63 is rendered conductive and during the time the L2 half cycle thyratron 62 is rendered conductive to cause corresponding ignition of the ignitrons 61 and 60 respectively.

From the foregoing it is apparent that the adjustment of the slider 19 on the resistor R6 will vary the potential impressed on the electrode $b2$ of the unijunction transistor 18. The adjustment of the slider 19 will vary the conducting voltage value of the unijunction transistor 18 and thus the instant of occurrence of arrow 3 in curve C during each half cycle of the current supply. The adjustment of the slider 19 is used to calibrate the circuitry for variations in the components used therein. The resistor R7 serves as a load resistor for the $b1$ electrode of the unijunction transistor 18 and as part of the RC discharge circuit for the capacitor C1.

The resistors R12 and R13 respectively govern the rates of discharge and charging of the capacitor C2 and thereby vary the periods of up slope and down slope firing of the ignitrons 60 and 62 so that the flow of current to the load 60 is progressively increased and decreased at the beginning and end of the weld interval.

The resistors R22 and R24 of the up slope down slope circuitry respectively provide manual adjustments for the initial and final currents which control the charging rate of the capacitor C1 and therefore the initial and final welding currents when the switch SW1 completes a circuit through the contact K1 and the switch SW2 is open. The resistors R30 and R29 respectively provide a manual adjustment of the starting and regulated welding current flow when the switch SW1 is positioned to complete a circuit with the contact K2. The resistor R31 and the capacitor C4 provide a stabilizing control for the current regulator section and are used to adjustably control the response of the transistor 56 to variations in the potential changes at the junction O.

The resistors R25 and R26 are both included in the circuit between the junction 44 and the contact K1. A variation in the settings of the resistors R25 and R26 will cause a variation in the charging rate of the capacitor C1 when the switch SW1 is in a circuit making position with the contact K1. The resistor R26 is provided to adjust the circuit for variations in the power factor of the supply in a manner well known to those skilled in the art. The resistor R25 is used to vary the heat control function of the welder and the effect of the current represented by the horizontal portion of the curve M during the interval which begins at the end of up slope and at the beginning of down slope when the switch SW2 is open.

When the switch SW1 is closed to complete a circuit with the contact K1 and the switch SW2 is open, the up-slope down-slope circuitry will control the charging rate of the capacitor C1 as was previously described. When the switch SW2 is closed, the junction 44 is directly connected to the ground G and the control exercised by the up-slope, down-slope circuitry is effectively shorted. Thus when the switch SW1 is in a circuit making position with the contact K2 and the switch SW2 is closed, the charging of the capacitor C1 is exclusively controlled by the adjustment of the resistors R25 and R26. This arrangement will permit the welding current flow to be manually controlled without current regulation or the up-slope and down-slope functions previously described.

Further, while the control as herein disclosed has been described as employing thyratron type gaseous tubes and tubes known as ignitrons to control the flow of welding current from the source indicated by lines L1 and L2 to the welding transformer 66 in response to signal changes at the terminal L, it is apparent circuitry employing other components may be employed. An example of a control which may be used includes the replacement of the thyratrons and/or the ignitrons with silicon controlled rectifiers and the necessary circuits which would control the proper conduction of the silicon controlled rectifiers in response to the changes in the signal at the terminal L.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a resistance welder control the combination comprising; a polarity responsive means for passing alternate polarity half cycles of an alternating current from an alternating current source to a load, a weld timer providing output signals for initiating and terminating weld interval during which the polarity responsive means passes current to the load, a heat control circuit having a chargeable capacitor and means for synchronizing a complete discharge and the charging of the capacitor with reversals in polarity of the source, an up-slope down-slope circuit for varying the rate of charge of the capacitor at the beginning and at the end of each weld interval, means including a transistor in said heat control circuit which is responsive to the charge on the capacitor for supplying an output signal whenever the charge on the capacitor reaches a predetermined value, and a logic circuit having inputs responsive to the output signal of the transistor and the means for synchronizing the charging of the capacitor for supplying signals of predetermined polarity to the polarity responsive means for controlling the current flow from the source to the load.

2. In a resistance welder control; the combination comprising; a heat control circuit having: a chargeable capacitor, circuit means including a transformer and a transistor for synchronizing a complete discharge and the initiating of a charging interval of the capacitor with reversals in polarity of an alternating polarity source, circuit means for adjustably controlling the rate of charging of the capacitor during the charging intervals, and circuit means including a transistor which is responsive to the charge on the capacitor for supplying an output signal whenever the charge on the capacitor exceeds a predetermined value and a logic circuit having an input responsive to the output signal and additional inputs responsive to an output of the transformer for supplying signals of predetermined polarity at predetermined instants after each reversal in polarity in the alternating current source.

3. In a resistance welder control, the combination comprising; a weld timer providing an output signal for initiating and terminating a weld interval during which an alternating current is supplied to a load, a heat control circuit for adjustably controlling the intensity of current supplied to the load during the weld interval and a circuit means supplying an input signal to the heat control circuit for progressively increasing the intensity of current to the load for an adjustable interval after the initiation of the weld interval and for progressively decreasing the intensity of current flow to the load for an adjustable interval prior to the termination of the weld interval, said circuit means having; a transistor having an output for supplying the input signal to the heat control circuit, a capacitor connected to control the output of the transistor in response to a charge on the capacitor, circuit means providing a controllable discharge path for the charge on the capacitor, circuit means providing a controllable charging path for the capacitor and circuit control means responsive to an output signal from the weld timer for controlling the charging and discharging paths of the capacitor.

4. In a resistance welder control, the combination comprising; a weld timer providing a plurality of timed output signals including a signal for initiating a weld interval, a signal for terminating a weld interval and a signal for initiating a down-slope time interval, a polarity responsive means for passing alternate polarity half cycles of reversing polarity alternating current pulses from a source to a load, a heat control circuit having; a chargeable capacitor, circuit means including a transformer and a transistor for synchronizing a complete discharge and the initiating of a charging interval during each half cycle of reversals in polarity of the source, and circuit means responsive to a charge on the capacitor for providing an output signal to the polarity responsive means when the charge on the capacitor exceeds a predetermined value for causing the polarity responsive means to pass a half cycle of current to the load, and an up-slope down-slope control circuit having inputs responsive to the signals from the weld timer for providing a charging circuit for the capacitor at the beginning and the end of the weld interval which is different from the charging current during the remainder of the weld interval.

5. In a resistance welder control, the combination comprising; a weld timer providing a plurality of timed output signals including a signal for initiating and a signal for terminating a weld interval during which welding current is passed from an alternating current source to a welding load, a heat control circuit having; a chargeable capacitor, circuit means including a transformer and a transistor for synchronizing a complete discharge and the initiation of a charging interval of the capacitor at a predetermined instant during each half cycle reversal in polarity of the alternating current source, circuit means responsive to welding current flow for varying the charging current supplied to the capacitor during said half cycles for maintaining said welding current flow constant, means responsive to the charge on the capacitor for providing a reversing polarity output signal when the charge on the capacitor exceeds a predetermined value, logic means responsive to the output signal and to the signals from the weld timer for providing a reversing polarity signal in response to the reversals in polarity of the output signal, and means responsive to the output signals from the logic means for passing current from the source to the load in response to the output signals from the logic means.

6. In a resistance welder control, the combination comprising; a weld timer providing output signals for initiating and terminating a weld interval, a heat control circuit having; a chargeable capacitor, circuit means including a transformer and a transistor for synchronizing a complete discharge and the initiating of a charging interval of the capacitor with reversals in polarity of an alternating polarity source, circuit means responsive to the output signals of the weld timer for controlling the rate of charging of the capacitor during each of the charging intervals, and circuit means including a transistor which is responsive to the charge on the capacitor for supplying an output signal whenever the charge on the capacitor exceeds a predetermined value and a logic circuit having an input responsive to the output signal of the transistor and additional inputs responsive to an output of the transformer as well as the output signals of the weld timer for supplying signals of predetermined polarity at predetermined instants after each reversal in polarity in the alternating current source.

7. In a resistance welder control; the combination comprising; a weld timer providing a plurality of output signals including a signal for initiating a weld interval, a signal for initiating a down-slope time interval and a signal for terminating a weld interval, a heat control circuit having; a chargeable capacitor, circuit means including a transformer and a transistor for synchronizing a complete discharge and the initiating of a charging interval of the capacitor with reversals in polarity of an alternating polarity source, circuit means responsive to the output signals of the weld timer for controlling the rate of charging of the capaictor during each of the charging intervals so the charging rate of the capacitor at the beginning and end of the weld interval is different from the charging rate during the remainder of the interval, and circuit means including a transistor which is responsive to the charge on the capacitor for supplying an output signal whenever the charge on the capacitor exceeds a predetermined value and a logic circuit having an input responsive to the output signal and additional inputs responsive to an output of the transformer as well as the initiating and terminating output signals from the weld timer for supplying signals of predetermined polarity at predetermined instants after each reversal in polarity in the alternating current source.

8. In a resistance welder control; the combination comprising; a weld timer providing output signals for initiating and terminating a weld interval during which welding current flows through a load, a heat control circuit having; a chargeable capacitor, circuit means including a transformer and a transistor for synchronizing a complete discharge and the initiating of a charging interval of the capacitor with reversals in polarity of an alternating polarity source, circuit means responsive to the welding current flow through the load for controlling the rate of charging of the capacitor during the charging intervals in response to changes in the welding current flow, and circuit means including a transistor which is responsive to the charge on the capacitor for supplying an output signal whenever the charge on the capacitor exceeds a predetermined value and a logic circuit having an input responsive to the output signal and additional inputs responsive to an output of the transformer as well as the output signals of the weld timer for supplying signals of predetermined polarity at predetermined instants after each reversal in polarity in the alternating current source.

9. The combination as recited in claim 2 wherein the means controlling the charging rate of the capacitor causes the transistor to suply a plurality of output signals during each half cycle of the alternating current source.

10. The combination as recited in claim 8 wherein the means controlling the charging rate of the capacitor causes the transistor to supply a plurality of output signals during each half cycle of the alternating current source.

References Cited

UNITED STATES PATENTS

| 3,056,017 | 9/1962 | Peras | 219—110 X |
| 3,243,652 | 3/1966 | Meyer et al. | 315—194 |
| 3,267,382 | 8/1966 | Adem | 219—114 X |

RICHARD M. WOOD, *Primary Examiner.*

J. G. SMITH, *Assistant Examiner.*